United States Patent
Park

(10) Patent No.: US 11,937,058 B2
(45) Date of Patent: Mar. 19, 2024

(54) DRIVER'S VEHICLE SOUND PERCEPTION METHOD DURING AUTONOMOUS TRAVELING AND AUTONOMOUS VEHICLE THEREOF

(71) Applicants: Hyundai Motor Company, Seoul (KR); Kia Corporation, Seoul (KR)

(72) Inventor: Chong-Bae Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 349 days.

(21) Appl. No.: 17/236,371

(22) Filed: Apr. 21, 2021

(65) Prior Publication Data
US 2022/0210556 A1    Jun. 30, 2022

(30) Foreign Application Priority Data
Dec. 31, 2020  (KR) .................. 10-2020-0188914

(51) Int. Cl.
*H04R 3/12* (2006.01)
*B60W 40/08* (2012.01)
(Continued)

(52) U.S. Cl.
CPC ............... *H04R 3/12* (2013.01); *B60W 40/08* (2013.01); *B60W 50/0205* (2013.01);
(Continued)

(58) Field of Classification Search
CPC ........ H04R 3/12; H04R 1/025; H04R 1/1041; H04R 2420/07; H04R 2499/13;
(Continued)

(56) References Cited

U.S. PATENT DOCUMENTS 9,896,031 B1 * 2/2018 Groh ................... B60R 11/0217
2004/0193347 A1 * 9/2004 Harumoto ............... G08G 1/16
701/45
(Continued)

FOREIGN PATENT DOCUMENTS

CN      107392094 A  * 11/2017  ............. B60R 16/02
CN      109068227 A  * 12/2018  ........... H04R 1/1041
(Continued)

OTHER PUBLICATIONS

Alarifi_et_al_NPL_UWB_positioning_2016 (Year: 2016).*
(Continued)

*Primary Examiner* — Jelani A Smith
*Assistant Examiner* — George A Alcorn, III
(74) *Attorney, Agent, or Firm* — Fox Rothschild LLP

(57) ABSTRACT

A driver's vehicle sound perception method during the autonomous traveling of a driver sound control system applied to an autonomous vehicle is provided. The method includes determining a mobile device and Bluetooth earphones held by a driver within a cabin, and setting the driver position and face direction for the driver, a driver relative distance for the individual controller, and the sound pressure and cycle of an alert for a failure situation of the individual controller by a DSM controller of the DSM system. The method confirms the utterance position of the alert for the driver by an AVNT controller of the AVNT system, and reproduces the failure situation of the individual controller by a vehicle speaker or the Bluetooth earphones to reproduce the vehicle alert through the left/right Bluetooth earphones in the driver's ears at autonomous Lv.4, freeing the driver from driving.

19 Claims, 9 Drawing Sheets

(51) Int. Cl.
*B60W 50/02* (2012.01)
*B60W 50/14* (2020.01)
*B60W 60/00* (2020.01)
*G06F 3/16* (2006.01)
*G06V 20/59* (2022.01)
*G06V 40/16* (2022.01)
*H04R 1/02* (2006.01)
*H04R 1/10* (2006.01)
*H04W 4/80* (2018.01)

(52) U.S. Cl.
CPC ............ *B60W 50/14* (2013.01); *B60W 60/00* (2020.02); *G06F 3/165* (2013.01); *G06V 20/593* (2022.01); *G06V 40/161* (2022.01); *H04R 1/025* (2013.01); *H04R 1/1041* (2013.01); *H04W 4/80* (2018.02); *B60W 2420/42* (2013.01); *B60W 2540/223* (2020.02); *B60W 2540/225* (2020.02); *B60W 2540/227* (2020.02); *H04R 2420/07* (2013.01); *H04R 2499/13* (2013.01)

(58) Field of Classification Search
CPC ............ H04R 2420/05; B60W 40/08; B60W 50/0205; B60W 50/14; B60W 60/00; B60W 2420/42; B60W 2540/223; B60W 2540/225; B60W 2540/227; B60W 60/001; B60W 2050/021; B60W 2050/143; B60W 2420/52; B60W 2040/0872; G06F 3/165; G06V 20/593; G06V 40/161; G06V 20/597; H04W 4/80; H04W 4/48; H04S 2400/11; H04S 7/304; B60R 11/02; B60R 11/04; B60R 2011/0276; G10L 15/00

USPC ............................................. 381/86; 701/400
See application file for complete search history.

(56) References Cited

U.S. PATENT DOCUMENTS

| | | | |
|---|---|---|---|
| 2015/0094897 A1 | 4/2015 | Cuddihy et al. | |
| 2016/0188285 A1* | 6/2016 | Luk .................. | G06F 3/165 700/94 |
| 2016/0292997 A1* | 10/2016 | Milne ................ | H04W 4/80 |
| 2019/0230213 A1* | 7/2019 | Konchan ............ | H04W 4/40 |
| 2020/0007988 A1* | 1/2020 | Raj .................... | H04W 4/023 |
| 2021/0034059 A1* | 2/2021 | Nagata ............... | B60W 60/0015 |
| 2021/0297769 A1* | 9/2021 | Brummer ........... | B60K 35/00 |
| 2022/0048529 A1* | 2/2022 | Ding .................. | G06V 10/26 |
| 2022/0126837 A1* | 4/2022 | Croxford ........... | B60W 50/16 |
| 2022/0289249 A1* | 9/2022 | Imai .................. | B60W 60/0059 |

FOREIGN PATENT DOCUMENTS

DE   102018125028 A1 *  7/2019
JP   2014169022 A  *  9/2014

OTHER PUBLICATIONS

Fiedler_et_al_DE_102018125028_A1_07_2019_translated_description (Year: 2019).*
Shi_et_al_CN_107392094_A_2017_translated_description (Year: 2017).*
Zhou_and_Lyu_CN_109068227_A_2018_translated_description (Year: 2018).*
Nishida_JP_2014169022_A_2014_translated_description (Year: 2014).*
Alarifi et al., UWB positioning, 2016 (Year: 2016).*

* cited by examiner

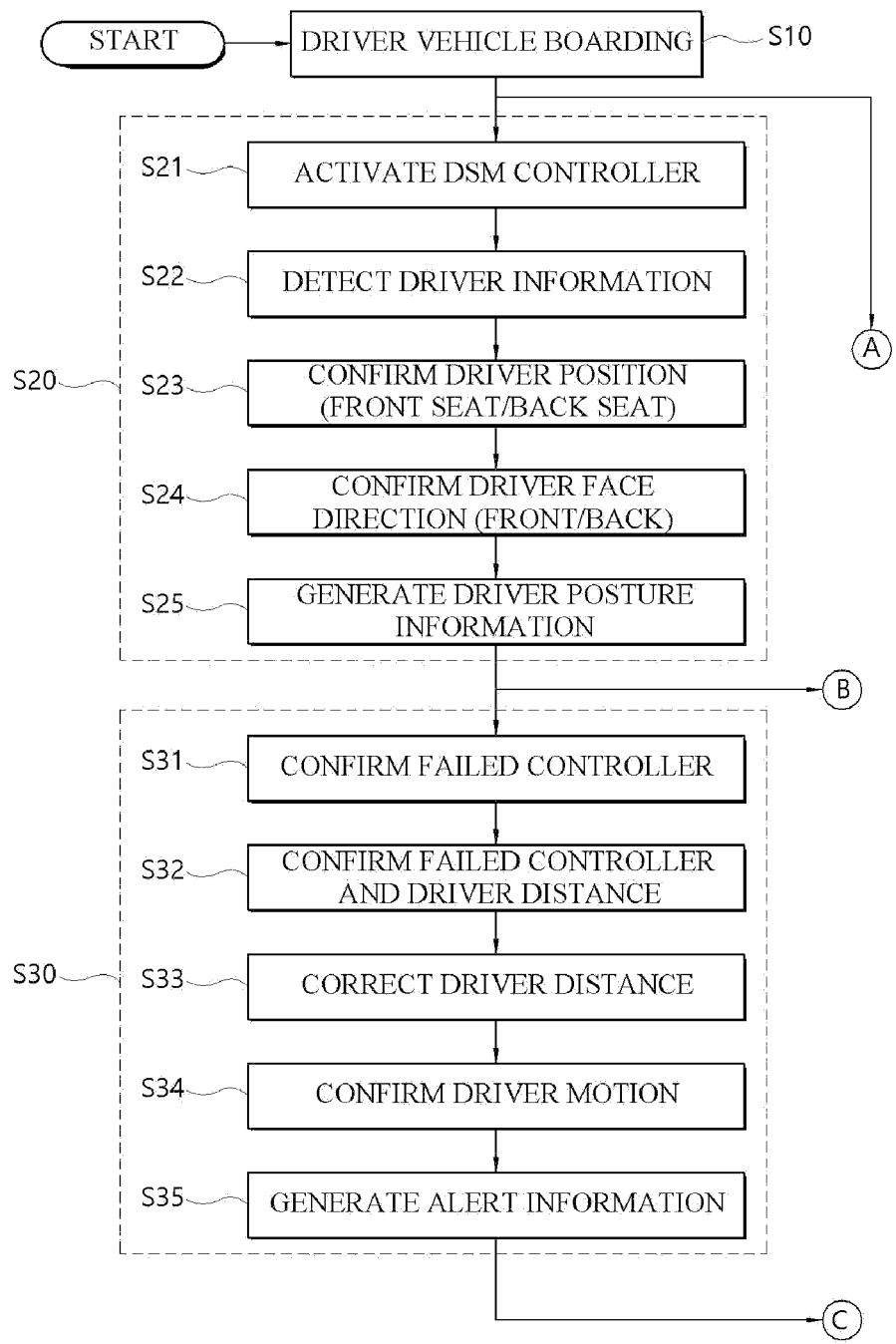

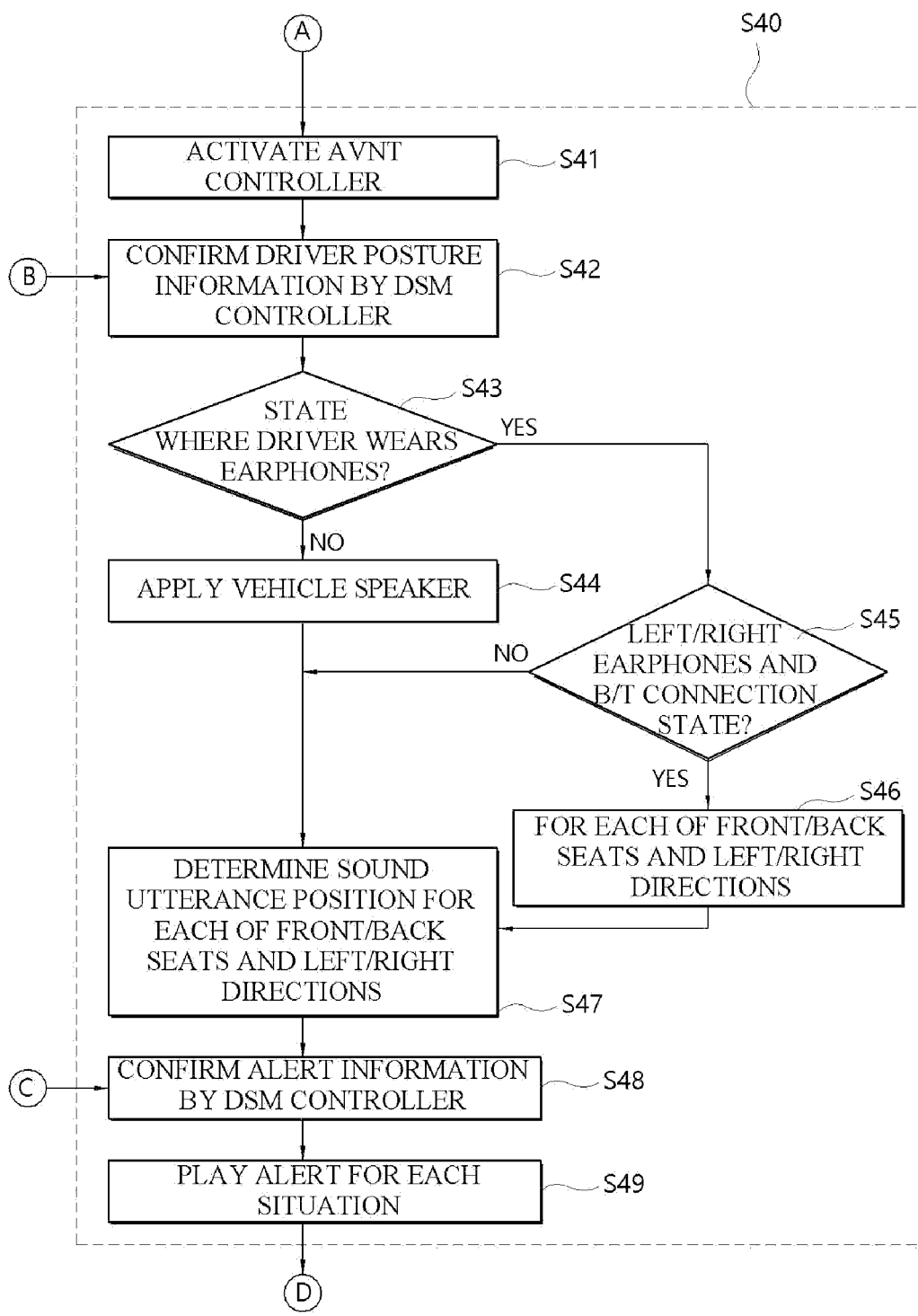

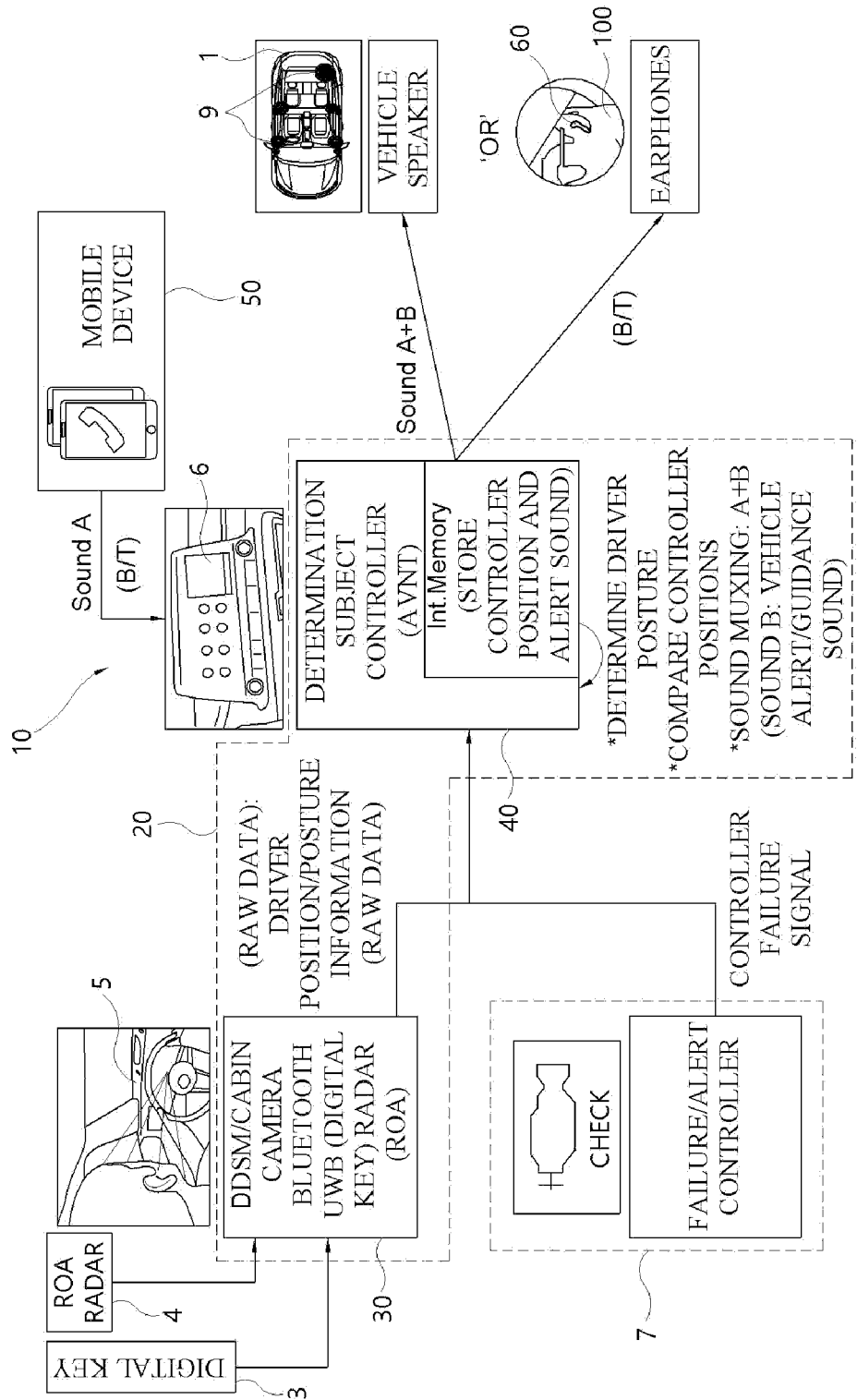

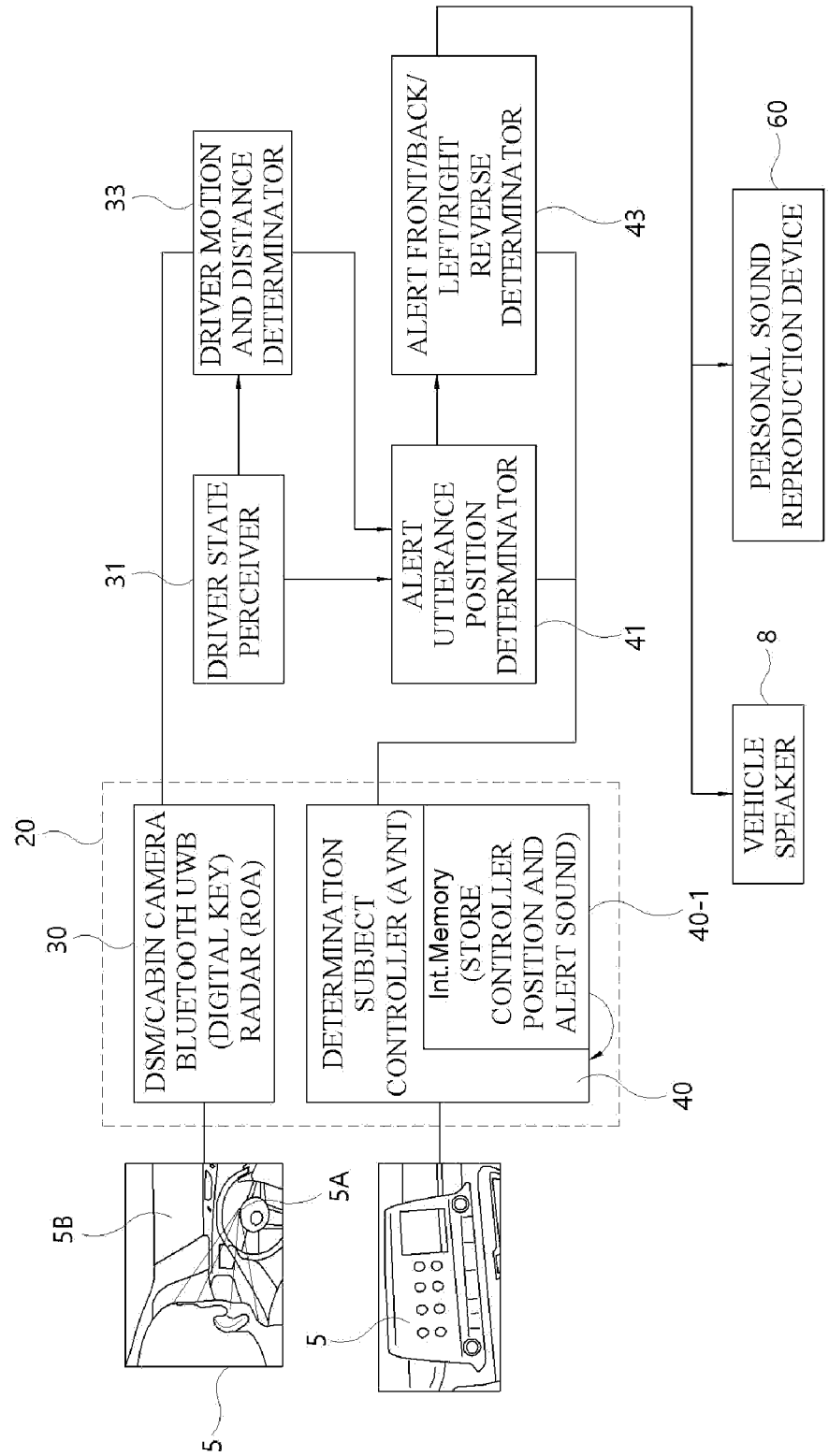

(AUTONOMOUS TRAVELING LEVEL 4 STATE)

9:9A,9B,9C,9D,9E

DRIVER'S VEHICLE SOUND PERCEPTION METHOD DURING AUTONOMOUS TRAVELING AND AUTONOMOUS VEHICLE THEREOF

CROSS-REFERENCE TO RELATED APPLICATION

This application claims priority to Korean Patent Application No. 10-2020-0188914, filed on Dec. 31, 2020, which is incorporated herein by reference in its entirety.

BACKGROUND

Field of the Disclosure

The present disclosure relates to a vehicle sound provision technology, and more particularly, to an autonomous vehicle, which allows a driver to perceive the vehicle sound during the autonomous traveling during which the active countermeasure of the driver may be induced by a generation direction control of the vehicle sound determined in consideration of a personal sound reproduction device (e.g., earphones/smart speaker) used by the driver in the autonomous traveling environment.

Description of Related Art

Generally, a level classification applied to an autonomous vehicle is expressed in Table 1 below.

TABLE 1

| Level | Summary | Contents | System |
|---|---|---|---|
| Level 0 | Automation X | A driver fully controls a vehicle | — |
| Level 1 | Driver assistance | Steering, acceleration/deceleration automation driver assistance | Cruise control system (cruise control_ACC) |
| Level 2 | Partial autonomous traveling | A vehicle and a lane are perceived when traveling on the highway An interval with the preceding vehicle is maintained, a driver looks around | Advanced smart cruise control (ASCC) Lane keeping assistance system (LKAS) |
| Level 3 | Conditional autonomous traveling | An autonomous traveling is possible in a pre-determined section The driver looks around the surrounding situation to prepare for the unexpected situation | Advanced driver assistance system (ADAS) |
| Level 4 | Advanced autonomous traveling | All safety may be removed in a specific road condition | LIDAR system |
| Level 5 | Full autonomous traveling | All functions such as traveling and parking are automated without driver's intervention | Connected system |

Therefore, the autonomous vehicle has the advanced autonomous traveling as the level is increased, and the autonomous traveling advancement provides a driver with the convenience which may freely move within a vehicle.

As an example, in the autonomous level (Lv.) 3 or Lv.4 or more, unlike the conventional technology in which the driver should drive while looking ahead from a driver seat, the driver may turn around to take care of the sleeping baby on the back seat or another object in the back seat, and change the position of the seat such that the front seat faces the back seat. Further, in the autonomous Lv.3 or Lv.4 or more, the driver may reduce the concentration for the driving situation for the vehicle control, thereby getting in the driver seat in the state of wearing the personal sound reproduction device (e.g., Bluetooth earphones) to perform the vehicle driving.

The contents described in this section are merely to aid in the understanding of the background of the present disclosure and may include what is not previously known to those skilled in the art to which the present disclosure pertains. However, the driver may enter the autonomous vehicle in the state of wearing the personal sound reproduction device such as the Bluetooth earphones in the intended or unintended situation, and such a situation makes it difficult for the driver who listens to the earphones sound to perceive the sound provision function such as safety/security/alert provided by the vehicle in the state of freeing from the driving in the autonomous traveling environment.

As an example, the driver may not listen to the neighbor vehicle/noise and the safety/security/alert of his/her own vehicle when wearing the Bluetooth earphones supporting the noise cancelling function in the unintended state while the vehicle travels, thereby causing the dangerous situation. In particular, even when using the neighbor sound allowance function among the noise cancelling functions, the driver has difficulty in perceiving the clear sound in many cases, such that likewise, the driver is inevitably exposed to the danger.

Further, when wishing to maintain the personal privacy for the passenger by talking on the phone with the Bluetooth earphones, the driver may be exposed to the danger in which the driver does not listen to the neighbor sound due to the driver's intentional phone call using the Bluetooth earphones, and such a situation may prevent the driver from listening to the neighbor vehicle/noise and the safety/security/alert of his/her own vehicle, thereby causing the dangerous situation.

Particularly, in the situation where there is the sleeping baby or similar in the vehicle or the case of wishing to listen to the entertainment using a smart phone or a smart speaker together with the passenger, the driver may intentionally minimize the sound volume of the vehicle alert not to listen to the neighbor vehicle/noise and the safety/security/alert of his/her own vehicle, thereby causing a dangerous situation.

SUMMARY

Therefore, an object of the present disclosure considering the above point is to provide a driver's vehicle sound perception method during autonomous traveling and an autonomous vehicle thereof, which may determine the direction of the vehicle sound according to the position of a personal sound reproduction device (e.g., earphones/smart speaker) used by the driver in the autonomous traveling environment to allow the driver to perceive the vehicle sound provided to the personal sound reproduction device of the driver free from driving, thereby coping with the driving situation in the autonomous traveling environment, and particularly, determine the driver's face direction and the distance of the device together by a vehicle sound controller according to the position of the personal sound reproduction device (e.g., earphones/smart speaker) within the vehicle to determine the sound generation direction to change the alert directionality/cycle/sound pressure according to the driver's face direction and the distance of the device to inform the driver of the emergency situation more effectively, thereby inducing the driver's active countermeasure.

A driver's vehicle sound perception method during autonomous traveling according to the present disclosure for achieving the object may include: determining, by a controller, a driver state for a driver within a cabin with the function of a camera monitoring inside the vehicle, in the situation where an autonomous vehicle travels at an autonomous traveling grade; determining a driver relative distance for the driver and a failed controller within a cabin, in the situation where any one of vehicle system controllers for performing the vehicle function with the function of the camera monitoring inside the vehicle is failed; confirming an alert utterance position for any one of a vehicle speaker and a personal sound reproduction device of the driver within the cabin by a function of an audio system; determining an alert output position, which assigns the alert directionality by confirming a driver face direction and a driver position by the function of the audio system, sets the alert according to the alert directionality, and selects the failure countermeasure guidance according to the setting of the alert; and outputting the sound using any one of the vehicle speaker and the personal sound reproduction device as an alert means.

In an exemplary embodiment, the autonomous traveling grade is the level of the autonomous Lv.3 or Lv.4. The personal sound reproduction device is a mobile device or Bluetooth earphones. The determining of the driver state may include: activating the camera monitoring inside the vehicle, and detecting driver information by a camera image for the driver, confirming the driver position according to whether the driver is seated on a front seat or a back seat, confirming the driver face direction according to whether the driver faces the front of the vehicle or the back of the vehicle, and generating driver posture information by combining the driver position and the driver face direction. The camera image may be captured by the camera monitoring inside the vehicle configuring a driver state monitoring (DSM) system or a cabin camera installed within the cabin.

Additionally, the camera image designates a left earphone of the driver wearing the Bluetooth earphones of the personal sound reproduction device as the left direction of the vehicle and a right earphone thereof as the right direction of the vehicle. When the left earphone is determined at the left direction of the vehicle or the right earphone is determined at the right direction of the vehicle with respect to a vehicle traveling direction, the driver face direction is confirmed as being the front of the vehicle.

The determining of the driver relative distance may include: confirming a driver distance for a failed controller with the Bluetooth signal intensity of the personal sound reproduction device, in the situation where any one of the vehicle system controllers is failed, correcting the driver distance as a device-driver relative distance enhancing the accuracy with the information of a digital key or the information of a radar, confirming a driver boarding forward or a driver boarding backward as a driver motion according to whether a seat seated by the driver is rotated, and generating alert information by setting a sound pressure and a cycle by a combination of the device-driver relative distance and the driver boarding forward or the driver boarding backward.

Further, the information of the digital key is a measurement distance for the driver by applying ultra-wide band (UWB) information in an UWB triangulation method, the information of the radar is obtained by operating a rear occupant alert (ROA) installed on the back seat within the cabin in the autonomous traveling state, and the driver motion is confirmed by being captured by the camera monitoring inside the vehicle configuring a driver state monitoring (DSM) system or a cabin camera installed within the cabin.

As the preferred exemplary embodiment, the confirming of the alert utterance position includes: activating the audio system, and confirming driver posture information with the driver position and driver face direction obtained by perceiving the driver state delivered by the camera monitoring inside the vehicle, applying a vehicle speaker as an alert generation means, when the driver does not wear Bluetooth earphones of the personal sound reproduction device, applying the Bluetooth earphones or a mobile device of the personal sound reproduction device as the alert generation means, when the driver wears the Bluetooth earphones, determining a sound utterance position direction for the alert generation means within the cabin, confirming a sound pressure and a cycle as alert information obtained by perceiving the driver relative distance, and determining the alert reproduction for each situation with the sound utterance position direction and the alert information.

The confirming of the driver face direction may include: applying the left/right utterance positions and front/back utterance positions of the alert determined by an N block map of the audio system which classifies a space of the cabin into the block positions of the coordinates of (0, 0) to (n, n), in response to confirming that the face direction of the driver faces the front of the vehicle, and reversing and applying the left/right utterance positions and the front/back utterance positions of the alert, in response to confirming that the face direction of the driver faces the back of the vehicle.

The confirming of the driver position may include: applying the left/right utterance positions and front/back utterance positions of the alert determined by an N block map of the audio system which classifies a space of the cabin into the block positions of the coordinates of (0, 0) to (n, n), in response to confirming that the driver sits on a front seat, and reversing and applying the left/right utterance positions and the front/back utterance positions of the alert, in response to confirming that the driver sits on a back seat.

The setting of the alert may include: determining the cycle and sound pressure of the alert for an alert utterance distance determined by an N block map of the audio system which classifies a space of the cabin into the block positions of the coordinates of (0, 0) to (n, n), when the failed controller is confirmed. The alert utterance distance may be determined as the degree at which the driver is close to the block position, the sound pressure of the alert is greater as the driver is close to the block position, and the cycle of the alert is faster as the driver becomes closer to the block position.

The guiding of the failure countermeasure may include: determining a guidance utterance distance from an N block map of the audio system which classifies a space of the cabin into the block positions of the coordinates of (0, 0) to (n, n), when a guidance manual for the failed controller is confirmed and selecting a TTS of the guidance manual at the guidance utterance distance. The outputting of the sound classifies the personal sound reproduction device into a mobile device and Bluetooth earphones to use them together with the vehicle speaker for outputting the alert, and performs the sound mixing of the sound of the mobile device with alert sound and guidance sound to be reproduced by the vehicle speaker or the Bluetooth earphones.

Further, an autonomous vehicle according to the present disclosure for achieving the object may include: a DSM system; an AVNT system; a vehicle system controller including a plurality of individual controllers configured to perform the vehicle function; and a driver sound control system configured to determine a mobile device and Bluetooth earphones held by a driver within a cabin, set the driver position and face direction for the driver, a driver relative distance for the individual controller, and the sound pressure and cycle of an alert for a failure situation of the individual controller by a DSM controller of the DSM system, confirm the utterance position of the alert for the driver delivered by the DSM system by an AVNT controller of the AVNT system, and reproduce the failure situation of the individual controller by a vehicle speaker or the Bluetooth earphones.

The driver sound control system may be configured to correct the driver relative distance with information generated by an ultra-wide band (UWB) of a digital key and a radar of a rear occupant alert (ROA), and confirm the driver position and face direction with the image information of a DSM camera of the DSM system or a cabin camera installed within the cabin. The driver's vehicle sound perception method during the autonomous traveling applied to the autonomous vehicle according to the present disclosure implements the following operations and effects.

First, it may be possible to induce the active countermeasure of the driver by the generation direction control of the vehicle sound determined in consideration of the personal sound reproduction device (e.g., earphones/smart speaker) used by the driver in the autonomous traveling environment.

Second, it may be possible to inform the driver the emergency situation more effectively since the generation direction control of the vehicle sound considers the change in the alert directionality/cycle/sound pressure according to the driver's face direction and the distance of the device.

Third, it may be possible to allow the driver who listens to the earphone sound to accurately perceive the action method through the vehicle sound and the safety/security/alert provided by the failed controller in the state of freeing form the driving, thereby inducing the active countermeasure of the driver in the driving situation.

Fourth, it may be possible to minimize the sound disturbing the baby's sleep using the personal earphones in the case of intentionally minimizing the vehicle alert as in the case where the baby is sleeping within the vehicle.

Fifth, it may be possible to free the driver's motion within the vehicle if the autonomous Lv.3 or Lv.4 or more is supported and to intentionally listen to the entertainment using the smart phone or the smart speaker and the sounds such as the safety/security/alert of the vehicle.

Sixth, it may be possible to determine the direction of the sound according to the positions of the earphones/the smart speaker within the vehicle, thereby further freeing the indoor behavior in the autonomous vehicle.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 1A-1C and FIGS. 2A-2B are flowcharts illustrating a drive's vehicle sound perception method during the autonomous traveling according to the present disclosure.

FIG. 3 is a diagram illustrating an example of an autonomous vehicle enabling the driver to perceive the vehicle sound during the autonomous traveling according to the present disclosure.

FIG. 4 is a diagram illustrating an example of a controller configured as a controller of a camera monitoring inside the vehicle and a controller of an AVNT system according to the present disclosure.

DETAILED DESCRIPTION

Figure 1C:
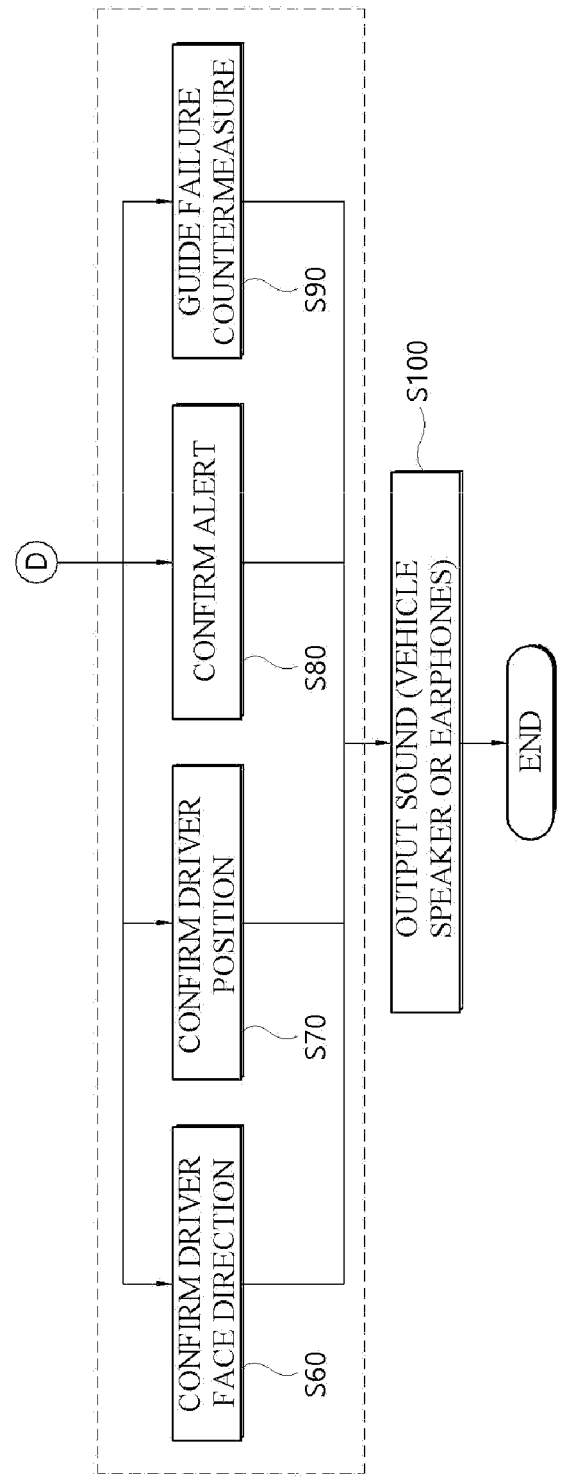

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying exemplary drawings, and the exemplary embodiment is an example and may be implemented in various different forms by those skilled in the art to which the present disclosure pertains, and thus is not limited to the exemplary embodiment described herein.

Referring to FIGS. 1A, B, C and 2A, B, a driver's vehicle sound perception method during the autonomous traveling generates driver posture information of driver's position and face direction (S25) by a step of perceiving a driver's state (S20) upon confirming the driver vehicle boarding (S20).

Then, the driver's vehicle sound perception method during the autonomous traveling determines reproducing the alert for each driver's situation (S49) by confirming an alert utterance position (S40) together with generating alert information of the sound pressure and the cycle based on the driver's motion and distance for a failed vehicle device (S35) by determining a driver's relative distance to the failed vehicle device based on the driver's position and face direction (S30) in the generating of the driver posture information (S25).

The driver's vehicle sound perception method during the autonomous traveling generates alert comprehensive information combining information determined by each of confirming the driver's face direction (S60), confirming the driver's position (S70), and confirming the alert (S80) by determining an alert output position (S50) based on reproducing the alert for each driver's situation (S49) by an alert directionality mechanism in the front/back/left/right directions and then outputs the alert comprehensive information together with driver guidance information of the failure countermeasure guidance (S90), thereby generating the alert in a vehicle speaker or a personal sound reproduction device (e.g., earphones or Bluetooth earphones) by outputting the sound (S100).

Therefore, the driver's vehicle sound perception method during the autonomous traveling may implement the change in the alert directionality/cycle/sound pressure according to the driver's face direction and the distance of the device by the alert directionality mechanism with respect to the generation of the alert informing the emergency situation of the vehicle or the failure of the vehicle device at the autonomous Lv.3 or Lv.4 or more freeing the driver's motion within a cabin of the autonomous vehicle, thereby informing the driver of the emergency situation more effectively compared to the conventional method irrelevant to the driver's posture.

Particularly, the alert directionality mechanism may inform the action methods for the failed device of the autonomous vehicle by the sound conversion function of the text by the text to speech (TTS), thereby inducing the active countermeasure of the driver.

Referring to FIG. 3, the autonomous vehicle 1 may include a driver sound control system 10. Specifically, the autonomous vehicle 1 may be configured to classify a cabin (i.e., a vehicle indoor space) into a front seat 2-1 for the driving and a back seat 2-2 for the passenger, perform the ultra-wide band (UWB) scheme communication with a digital key 3, and may include a radar 4, a camera monitoring inside the vehicle 5 (hereinafter a driver state monitoring (DSM) system), an audio system 6 (hereinafter an audio/video/navigation/telematics (AVNT) system), a vehicle system controller 7, and a vehicle speaker 9.

As an example, the front seat 2-1 may include a driver seat and a passenger seat, and the back seat 2-2 includes a rear seat. As an example, the digital key 3 may be configured to measure a fine distance for the driver or the passenger within the cabin with a broadband width having about 500 MHz of the UWB. The radar 4 may be configured to detect information about the driver' or passenger's distance within the cabin.

Particularly, the digital key 3 may be a smart phone key or a near field communication card key which provides the functions such as the door locking/unlocking, the remote start-up, the emergency alert, and the trunk opening at the distance of about 10 m using a Bluetooth low energy (BLE) scheme. Further, the radar 4 is a component of a rear occupant alert (ROA) installed on the back seat 2-2, and the ROA may be operated when the power source of the vehicle is turned off and operated in a ROA ON mode for determining the driver's indoor stay position in the autonomous traveling mode according to the autonomous vehicle 1, such that the information of the radar 4 may be detected.

Figure 6:
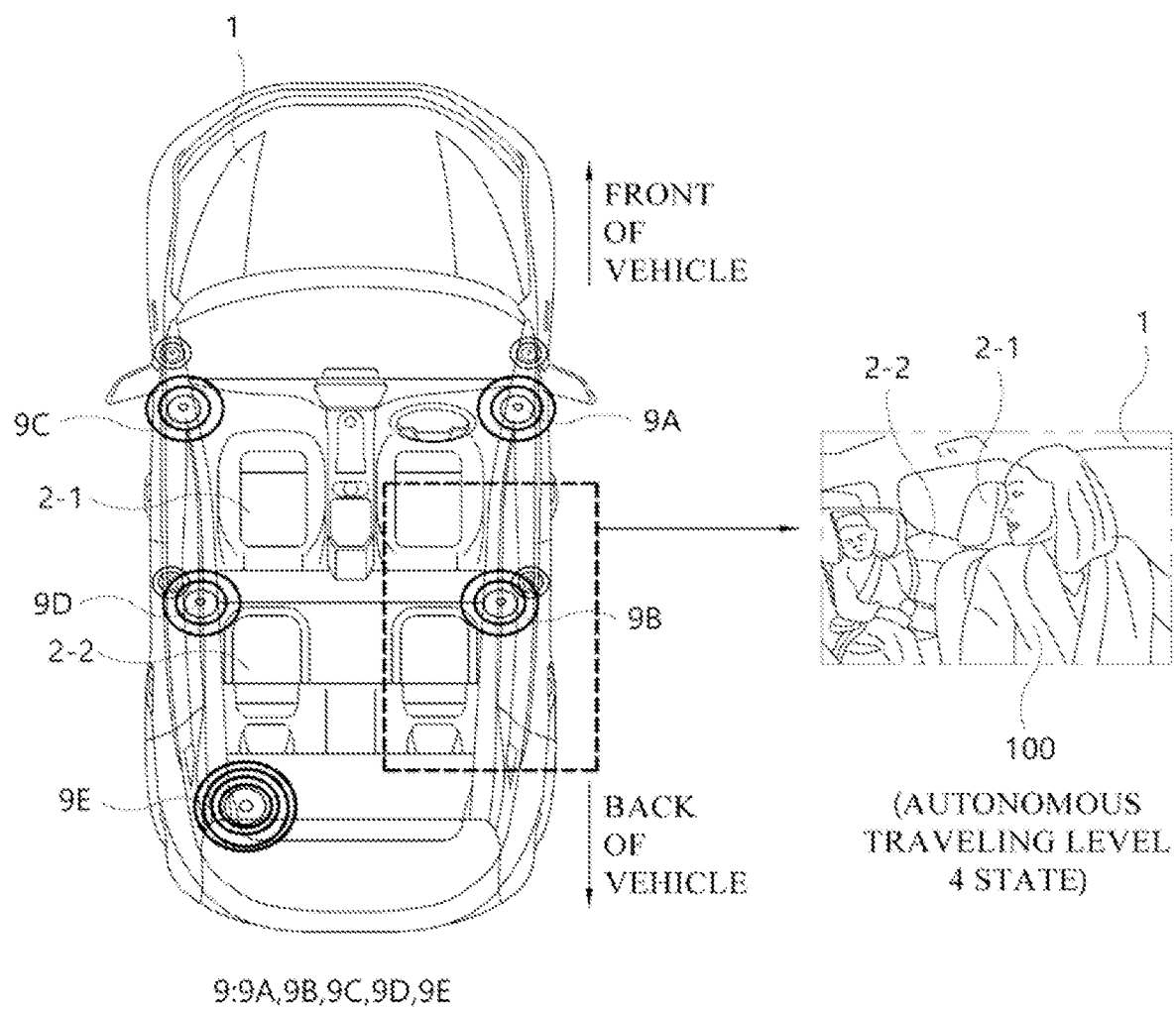
FIG. 6 is a diagram illustrating an example of the state of the driver who frees from the driving in the state where the autonomous vehicle according to the present disclosure travels at the autonomous Lv.3 or Lv.4 or more.

As an example, the DSM system 5 may mounted for the autonomous Lv.3 or Lv. 4 and may include a DSM camera 5A and a cabin camera 5B configured to capture the images for monitoring the driver. The AVNT system 6 refers to a system of combining the devices implementing each of the audio, video, navigation, and telematics functions to provide the entertainment such as music, image, and game together with delivering the information of the vehicle to the driver and the passenger. As an example, the vehicle system controller 7 may be configured to operate the vehicle device, and as illustrated in FIG. 6, the vehicle device may include left/right head lamps, front/back/left/right tires, an engine oil line, a fuel line, a seatbelt, an outside mirror, a trunk latch, a door latch, and the like.

Therefore, the vehicle system controller 7 may be an oil/fuel pump controller, an engine controller, a lamp controller, a seatbelt controller, a controller of a tire pressure monitoring system (TPMS), a controller of a blind-spot collision warning system (BCW), a controller of a rear cross alert system (RCA), a controller of a rear-end collision warning system (RCW), and a controller of a parking distance warning system (PDW).

Figure 5:
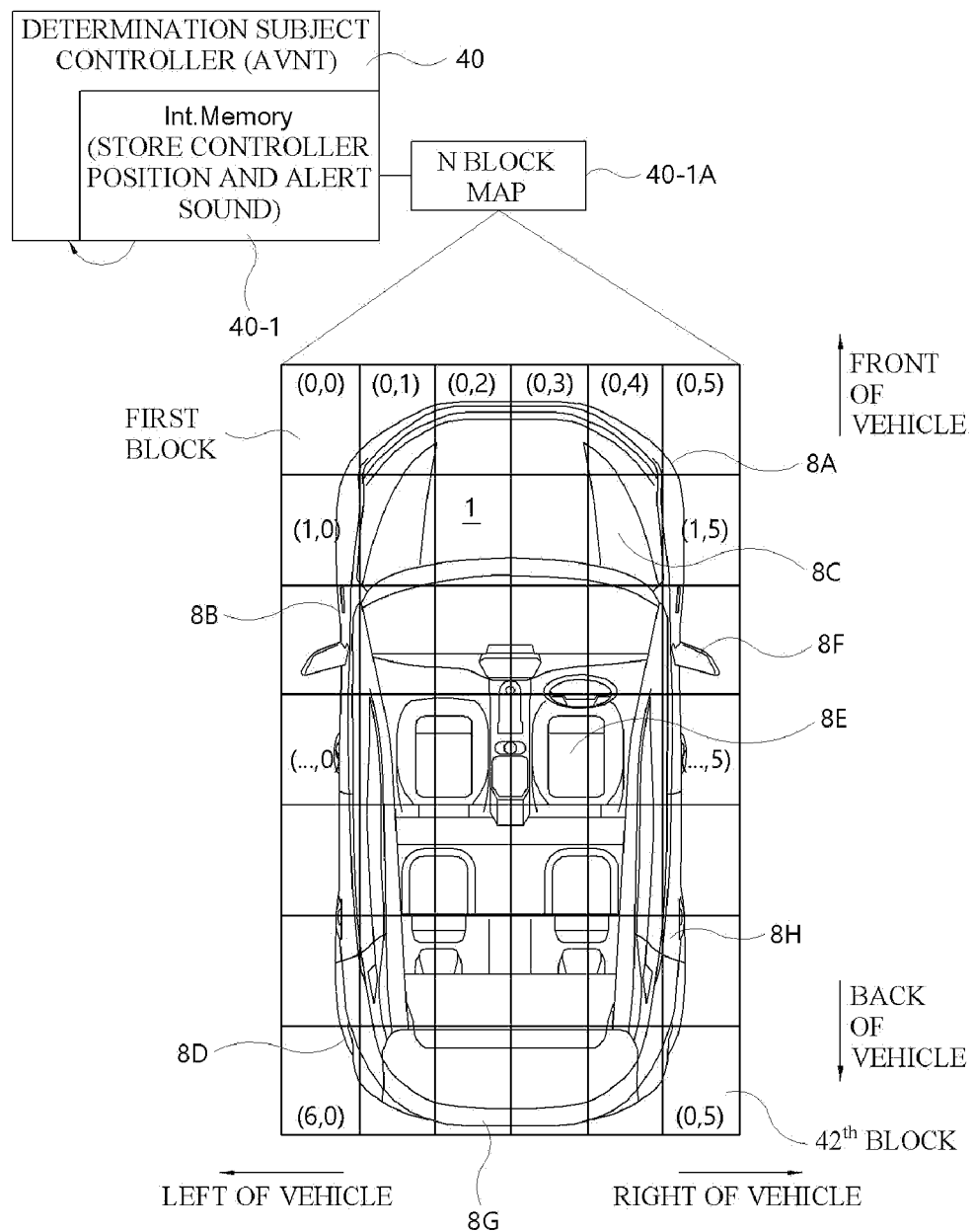
FIG. 5 is a diagram illustrating an example in which the distance between a failed device and the driver is confirmed by the coordinates for the position of a vehicle device confirmed by an N block map constructed in a memory of the AVNT controller among the controllers upon the traveling of the autonomous Lv.3 or Lv.4 or more according to the present disclosure.

As an example, as illustrated in FIG. 5, the vehicle speaker 9 may include five speakers including two speakers for the front seat 2-1 of the autonomous vehicle 1, two speakers for the back seat 2-2 thereof, and one speaker for the back and installed in the vehicle or composed of a larger number of speakers and installed in the vehicle. Specifically, the driver sound control system 10 may include a controller 20 and personal sound reproduction devices 50, 60.

As an example, the controller 20 may include a DSM controller 30 and an AVNT controller 40. In particular, the DSM controller 30 is a component of the DSM system 5 and may be configured to process a controller failure signal generated by the vehicle system controller 7 together with the information detected by the DSM system 5, and the AVNT controller 40 is a component of the AVNT system 6, and uses, as raw data, the driver's position/posture information of the DSM controller 30 together with the information detected by the AVNT system 6 and may be configured to synthesize the controller failure signal generated by the vehicle system controller 7 to execute the driver's vehicle sound perception method during the autonomous traveling.

Particularly, the AVNT controller 40 may include a memory 40-1, and the memory 40-1 may be configured to store an N block map 40-1A (see FIG. 6) for the vehicle application position of the vehicle system controller 7 while storing the alert sound. As an example, the personal sound reproduction devices 50, 60 include a mobile device 50 and Bluetooth earphones 60. In particular, the mobile device 50 may apply a smart phone, a note pad, or the like.

Hereinafter, the driver's vehicle sound perception method during the autonomous traveling illustrated in FIGS. 1A, B, C and 2A, B will be described in detail with reference to FIGS. 3 to 6. In particular, a control subject is the controller 20 combining the DSM controller 30 with the AVNT controller 40, and a control target is one or one or more of the vehicle speaker 9, the mobile device 50, and the Bluetooth earphones 60.

FIG. 3 illustrates that the controller 20 implements the driver's vehicle sound perception method during the autonomous traveling by communicating with the DSM controller 30 using the AVNT controller 40 as a main controller.

First, referring to FIGS. 1A, B, C and 2A, B illustrating the overall flow for the driver's vehicle sound perception method during the autonomous traveling, the controller 20 may be configured to determine that a driver 100 enters in the autonomous vehicle 1 in the determining of the driver state (S20) with respect to the driver vehicle boarding (S10). In particular, the confirming of the driver vehicle boarding (S10) may be confirmed by determining a signal of a weight sensor or a seating sensor installed on the front seat 2-1 by the activated DSM controller 30 of the controller 20. Therefore, the determining of the driver state (S20) may include performing the activation by the ON of the DSM controller (S21), detecting driver information (S22), confirming a driver position (S23), confirming a driver's face direction (S24), and generating driver posture information (S25).

Referring to FIG. 4, the controller 20 uses the DSM controller 30, and the DSM controller 30 uses a driver state perceiver 31 as a component to perform each step of the determining of the driver state (S20). As an example, the driver state perceiver 31 may be configured to detect of the driver information (S22) using the DSM camera 5A and/or the cabin camera 5B, may be configured to determine the driver position (S23) based on whether the driver 100 sits on the front seat 2-1 or the back seat 2-2, determine the driver face direction (S24) based on whether the face direction of the driver 100 faces forward or backward of the vehicle, and generate the driver posture information (S25) by putting them together, such that the driver posture information is generated as the driver position/face direction.

Particularly, the confirming of the driver face direction (S24) may include confirming the face direction in which the driver 100 faces by the DSM camera 5A and the cabin camera 5B. Furthermore, the confirming of the driver face direction (S24) may determine the positions of a left earphone and a right earphone with respect to the Bluetooth earphones 60 of the driver 100 for improving the accuracy of the driver face direction confirmed by the DSM camera 5A and the cabin camera 5B, and may determine that the face direction of the driver 100 faces forward in response to determining the left earphone as the left direction of the vehicle and the right earphone as the right direction of the vehicle with respect to the vehicle traveling direction, whereas determining that the face direction of the driver 100 faces backward in the opposite case.

As described above, the controller 20 may be configured to determine the driver state (S20) by the DSM controller 30, thereby securing the driver position/face direction for the driver 100 entering in the autonomous vehicle 1 as the driver posture information (S25). Then, the controller 20 may be configured to determine the driver relative distance (S30) and confirm the alert utterance position (S40) together based on the driver posture information (S25). As an example, the determining of the driver relative distance (S30) may include confirming a failed controller (S31), confirming the driver distance for the failed controller (S32), correcting the driver distance (S33), confirming the driver motion (S34), and generating the alert information (S35).

Referring to FIG. 4, the controller 20 uses the DSM controller 30, and the DSM controller 30 uses a driver motion and distance determinator 33 as the component to perform each step of the determining of the driver relative distance (S30). As an example, the driver motion and distance determinator 33 may be configured to determine the failed controller (S31) by detecting the controller failure signal of the vehicle system controller 7 together with the driver position/face direction information provided by the driver state perceiver 31, and determine the driver distance for the failed controller (S32) by confirming the earphones 60 of the driver 100 within the cabin of the vehicle and the device failed position of the vehicle system controller 7 using the DSM camera 5A and the Bluetooth signal intensity of the earphones 60 worn by the driver 100. As a result, the driver motion and distance determinator 33 may be configured to determine a device-driver relative distance.

Furthermore, the driver motion and distance determinator 33 may be configured to correct the device-driver relative distance calculated using the information of the radar 4 by the operation of the ROA in the autonomous traveling state while using the UWB information for the digital key 3 in the UWB triangulation method, thereby performing the correcting of the driver distance (S33) which reinforces and enhances the accuracy of the calculation distance.

Particularly, the determining of the driver motion (S34) includes determining the traveling direction and the driver boarding forward/backward by determining whether the seat of the front seat 2-1 on which the driver 100 sits is rotated or whether the driver 100 moves through the DSM camera 5A and/or the cabin camera 5B, and determining the driver boarding forward/backward, thereby improving the accuracy for the result of the determining of the driver face direction (S24). As a result, the driver motion and distance determinator 33 uses the device-driver relative distance and the driver motion as the alert information of the DSM to generate the alert information for the sound pressure and the cycle of the alert (S35).

As an example, the confirming of the alert utterance position (S40) may include performing the activation by the ON of the AVNT controller (S41), confirming the driver posture information by the DSM controller (S42), applying the vehicle speaker when the driver does not wear the earphones (S43, S44), applying the driver earphones when the driver wears the earphones (S45, S46), determining the front/back seat and left/right directional sound utterance positions (S47), confirming the alert information by the DSM controller (S48), and reproducing the alert for each situation (S49).

Referring to FIG. 4, the controller 20 uses the AVNT controller 40, and the AVNT controller 40 uses an alert utterance position determinator 41 as the component to perform each step of the confirming of the alert utterance position (S40).

As an example, the alert utterance position determinator 41 may be configured to confirm the driver posture information by the DSM controller (S42) by reading the alert information of the DSM generated by the driver motion and distance determinator 33 of the DSM system 5, confirm the state of whether the driver wears the earphones according to whether the driver 100 has the earphones 60 in the ears (S43) and then enter into the applying of the vehicle speaker (S44) if there are not the earphones 60 to select an alert utterance means as the vehicle speaker 9.

On the other hand, the alert utterance position determinator 41 may be configured to determine the driver earphones wearing state by the Bluetooth connection state (S45) together with whether the Bluetooth earphones 60 are in the left/right ears of the driver 100, if the driver 100 has the earphones 60 in the ears, and then switch the step to the applying of the vehicle speaker (S44) when it is not the Bluetooth connection state whereas entering into the applying of the driver earphones (S46) when it is the Bluetooth connection state to select the alert utterance as the Bluetooth earphones 60. Therefore, the alert utterance position determinator 41 may be configured to determine the front/back seat and left/right directional sound utterance positions (S47) by the applying of the vehicle speaker (S44) or the applying of the driver earphones (S46).

Then, the alert utterance position determinator 41 may be configured to confirm the alert utterance position by reading the information about the sound pressure and cycle of the alert of the generating of the alert information (S35) generated by the driver motion and distance determinator 33 of the DSM controller 30, and then confirm the driver relative distance for the failed vehicle device together with the position/face direction of the driver getting in the cabin within the vehicle to determine the reproducing of the alert for each situation (S49).

Subsequently, the controller 20 may be configured to determine the alert output position (S50) based on the reproducing of the alert for each situation (S49). As an example, the determining of the alert output position (S50) controls the alert directionality by the confirming of the driver face direction (S60) and the confirming of the driver position (S70), performs the confirmation of the cycle/sound pressure of the alert by the confirming of the alert adjustment (S80), and performs the text-voice automatic conversion by the text to speech (TTS) by the guiding of the failure countermeasure (S90).

Referring to FIG. 4, the controller 20 uses the AVNT controller 40, and the AVNT controller 40 uses an alert front/back/left/right reverse determinator 43 as the component to perform each step of the determining of the alert output position (S50). As an example, the alert front/back/left/right reverse determinator 43 may be configured to confirm the mobile device 50 and the earphones 60 of the driver 100, and use the alert information of the DSM generated by the driver motion and distance determinator 33 of the DSM system 5 to confirm the driver relative distance for the vehicle device together with the position/face direction of the driver entering the cabin within the vehicle, such that the confirming of the driver face direction (S60) and the confirming of the driver position (S70) are performed.

Further, the alert front/back/left/right reverse determinator 43 may be configured to generate the alert combination information (see S99 illustrated in FIG. 2) matching the alert directionality/cycle/sound pressure with the legal alert regulations and the driver preference sound by the alert directionality mechanism together with the front/back/left/right directions for the driver 100 in response to confirming the device failure signal (S48) generated by the vehicle system controller 7, and output the result of the combination information to reproduce the alert in any one or one or more of the vehicle speaker 9, the mobile device 50, and the earphones 60.

Figure 2A:
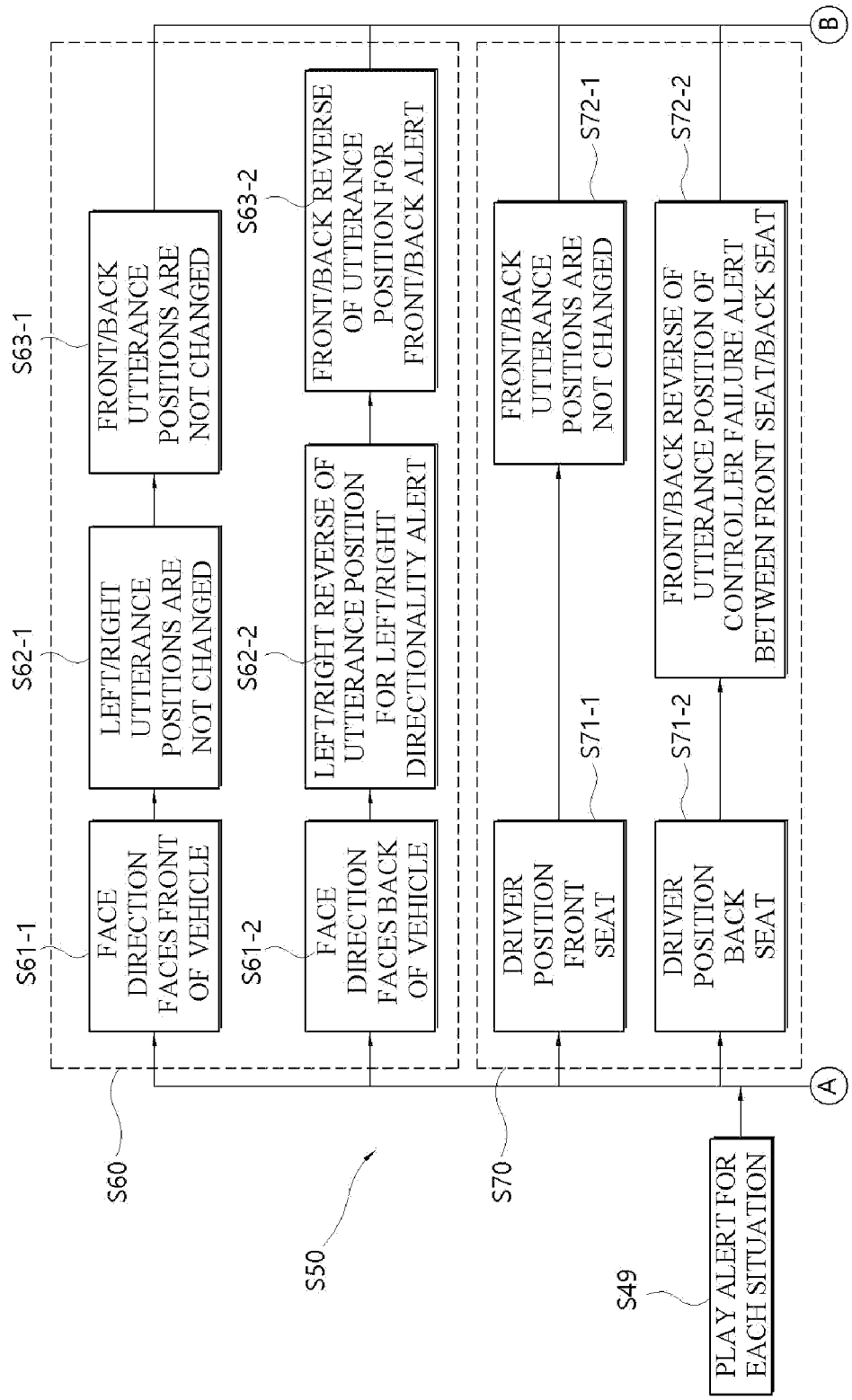
Figure 2B:
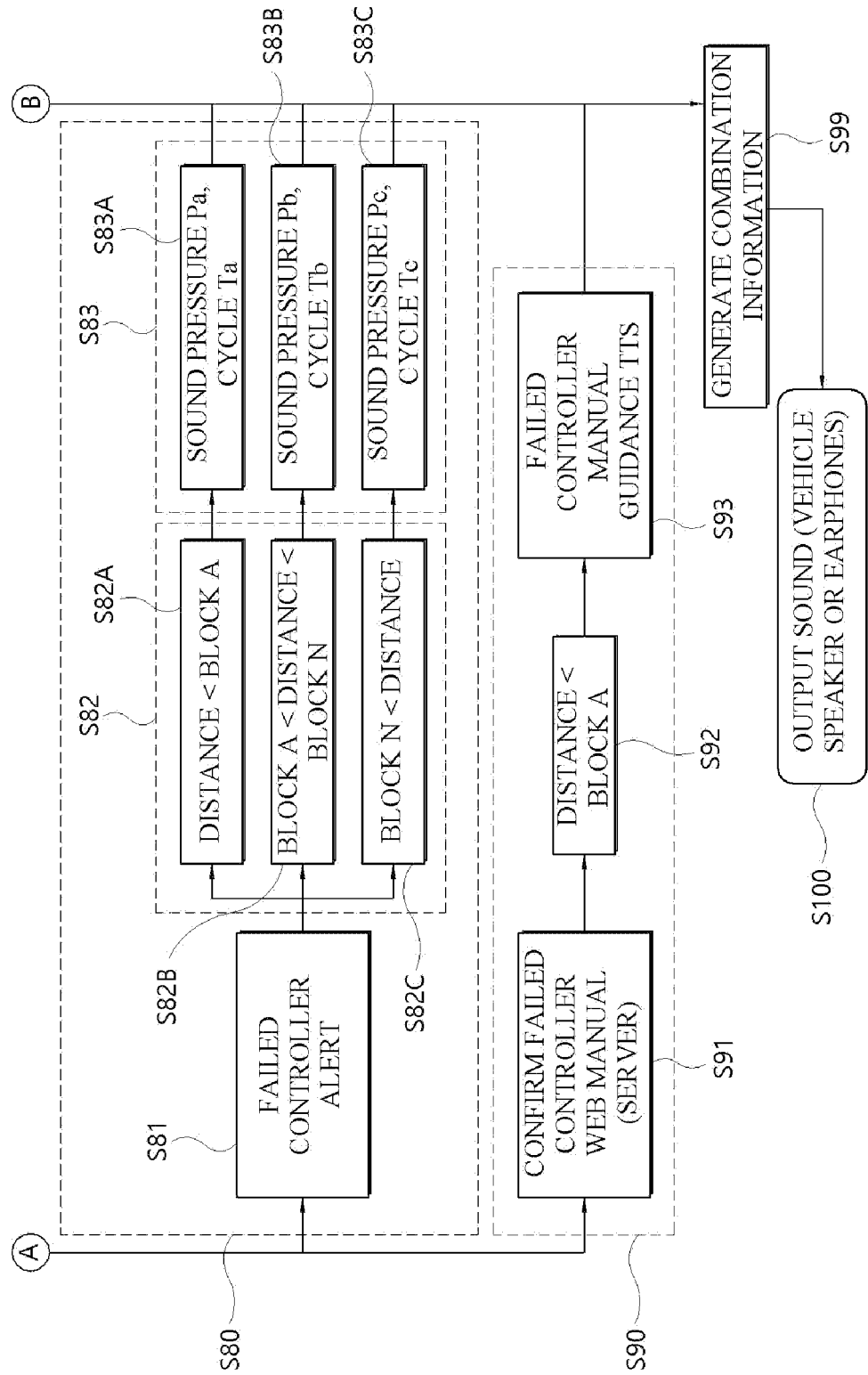

FIGS. 2A and 2B illustrates the specific implementation steps for the confirming of the driver face direction (S60), the confirming of the driver position (S70), the confirming of the alert (S80), and the guiding of the failure countermeasure (S90) performed by the controller 20.

FIG. 5 illustrates an example in which the N block map 40-1A constructed in the memory 40-1 of the AVNT controller 40 constructs the vehicle application position of the vehicle system controller 7 as N blocks (N refers to an integer of 1 or more). In particular, the size value and section of the block applied to the N block map 40-1A are determined by the distance between each of the vehicle system controller 7 and the driver 100, thereby being efficiently determined by the size of the cabin of the autonomous vehicle 1.

As an example, the N block map 40-1A selects and stores the coordinate position as (0, 0) to (n, n). Accordingly, the N block map 40-1A uses the vertical direction of the autonomous vehicle 1 as the forward/backward lengths to divide the vertical direction into about seven vertical sections and uses the horizontal direction thereof as the left/right widths to divide the horizontal direction into six horizontal sections, and is constructed to assign the position numbers to a total of 42 blocks formed by each of the seven vertical sections and the six horizontal sections as the coordinate of (0, 0) to the coordinate of (0, 5), . . . , the coordinate of (6, 0) to the coordinate of (6, 5). Therefore, the N block map 40-1A uses the coordinate of (0, 0) as a block 1 at the first position to designate the coordinate of (6, 5) as a block 42 at the last position, such that the numbers for a total of 42 blocks are sequentially assigned.

From the block numbers, a right headlamp problem block 8A by designating the coordinate of (0, 5) as a block 6 at the $6^{th}$ position, a front left tire problem block 8B by designating the coordinate of (2, 0) as a block 13 at the $13^{th}$ position, an engine oil problem block 8C by designating the coordinate of (1, 4) as a block 11 at the $11^{th}$ position, a fuel system problem block 8D by designating the coordinate of (6, 0) as a block 37 at the $37^{th}$ position, a passenger seat seatbelt non-fastening block 8E by designating the coordinate of (3, 4) as a block 22 at the $22^{th}$ position, a right outside mirror failure block 8F by designating the coordinate of (2, 5) as a block 18 at the $18^{th}$ position, a trunk open block 8G by designating the coordinate of (6, 2) as a block 39 at the $39^{th}$ position, and a back right door open block 8H by designating the coordinate of (5, 5) as a block 36 at the $36^{th}$ position may be confirmed, and the relative distance held by the driver 100 for each of the vehicle system controller 7 is confirmed using each of the blocks 8A to 8H for each coordinate.

Therefore, the implementation steps of the confirming of the driver face direction (S60), the confirming of the driver position (S70), the confirming of the alert (S80), and the guiding of the failure countermeasure (S90) are as follows. As an example, the confirming of the driver face direction (S60) may include confirming the driver face direction facing the front of the vehicle (S61-1), maintaining the left/right utterance positions for the alert (S62-1), and maintaining the front/back utterance positions for the alert (S63-1), or may include confirming the driver face direction facing the back of the vehicle (S61-2), reversing the left/right utterance positions for the alert (S62-2), and reversing the front/back utterance positions for the alert (S63-2).

Therefore, the confirming of the driver face direction (S60) applies the left/right utterance positions and the front/back utterance positions of the alert determined by the N block map 40-1A of the AVNT system 6 which classifies a space of the cabin into the block positions of the coordinates of (0, 0) to (n, n), in response to confirming that the face direction of the driver 100 faces the front of the vehicle. On the other hand, the confirming of the driver face direction (S60) reverses and applies the left/right utterance positions and the front/back utterance positions of the alert, in response to confirming that the face direction of the driver 100 faces the back of the vehicle.

As a result, the confirming of the driver face direction (S60) compares and determines the position block (i.e., the N block) of the vehicle system controller 7 matching the positions of the Bluetooth earphones 60 and the vehicle speaker 9, and then determines the sound directionality of the alert as any one of the front/back/left/right. Particularly, the situation where the driver 100 faces the back of the vehicle may occur in the autonomous vehicle 1 which may allow the seat of the front seat 2-1 to face the back, and the left/right of the conventional vehicle is changed in such a situation, such that the alert direction is also changed by the left/right reverse.

As an example, the confirming of the driver position (S70) may include confirming a driver position front seat (S71-1) and maintaining the front/back utterance positions (S72-1) or may include confirming a driver position back seat (S71-2) and reversing the front/back utterance positions (S72-2). In particular, as illustrated in FIG. 6, the reversing of the front/back utterance positions (S72-2) indicates the front/back reverse for the utterance positions of the failure alert of the vehicle system controller 7 between the front seat 2-1 and the back seat 2-2.

Therefore, the confirming of the driver position (S70) applies the left/right utterance positions and the front/back utterance positions of the alert determined by the N block map 40-1A of the AVNT system 6 which classifies a space of the cabin into the block positions of the coordinates of (0, 0) to (n, n), in response to confirming that the driver 100 sits on the front seat 2-1. On the other hand, the confirming of the driver position (S70) reverses and applies the left/right utterance positions and the front/back utterance positions of the alert, in response to confirming that the driver 100 sits on the back seat 2-2.

Particularly, the alert direction is also changed by the front/back reverse in the situation where the alert is generated on the front of the autonomous vehicle 1, such that the front alert is changed to the back alert of the driver, and as a result, the alert is generated in front of the ears such that the driver 100 may feel the directionality. As an example, this may be the situation such as the front alert of TPMS front wheel abnormal operation, the front PDW/BCW, or the like.

Further, the alert direction may also be changed by the front/back reverse in the situation where the alert is generated on the back of the autonomous vehicle 1, to change the back alert to the front alert of the driver, and as a result, the alert may be generated in back of the ears such that the driver 100 may feel the directionality. As an example, this may be the situation such as the back alert of TPMS rear wheel abnormal operation, the BCW/RCA/RCW/Rear PDW, or the like.

As an example, the confirming of the alert (S80) may include confirming the failed controller alert (S81), determining the alert utterance distance (S82), and determining the cycle/sound pressure of the alert (S83). Therefore, the confirming of the alert (S80) may include determining the cycle and sound pressure of the alert for the alert utterance distance determined by the N block map 40-1A of the AVNT system 6 which classifies a space of the cabin into the block positions of the coordinates of (0, 0) to (n, n), when the failed controller is confirmed.

Particularly, the determining of the alert utterance distance (S82) is applied by being classified into confirming the distance<a block A (S82A), confirming the block A<the distance<a block N (S82B), and confirming the block N<the distance (S82C). Further, the determining of the cycle/sound pressure of the alert (S83) is classified into applying a sound pressure (Pa)/a cycle (Ta) (S83A), applying a sound pressure (Pb)/a cycle (Tb) (S83B), and applying a sound pressure (Pc)/a cycle (Tc) (S83C).

Accordingly, in the distance<the block A (S82A), the block A<the distance<the block N (S82B), and the block N<the distance (S82C), the "distance" refers to a value of the distance (i.e., the block N) between the vehicle system controller 7 and the driver 100 efficiently determined according to the size of the cabin of the vehicle and the "A" uses 1. In this case, the "<" refers to the inequality sign representing the closest degree relationship between two values, such that the "the block A<the distance<the block N" represents that the "distance" is the position closer to the "block A" because it is further away from the "block N" of the "block A" and the "block N".

For example, the position of the failed controller is the coordinate of (0, 5) (see FIG. 6) upon failure of the headlamp, and the block 1 is the first block position designated by the N block map 40-1A and represents the degree of the approaching position for the driver 100, such that the manual contents together with the generation of the alert may be set as the criterion of reproducing the TTS when the driver 100 approaches within the block 1 (e.g., (0, 4), (1, 4), (1, 5)). Further, the sound pressure (Pa)/the cycle (Ta) (S83A), the sound pressure (Pb)/the cycle (Tb) (S83B), and the sound pressure (Pc)/the cycle (Tc) (S83C) are set as Pa=90 dB, Ta=0.1 s, Pb=80 dB, Tb=0.3 s, and Pc=60 dB, Tc=0.5 s, respectively.

In other words, the sound pressures (Pa/Pb/Pc) and the cycles (Ta/Tb/Tc) differentiates the directionality alert generated by the position relative comparison between the vehicle mounting position and the driver 100 in the N block map 40-1A with respect to the failed controller when the vehicle system controller 7 is failed, and as a result of the position relative comparison, applies a larger sound volume and/or a faster cycle as the distance between the failed controller and the driver is close or closer.

As an example, the guiding of the failure countermeasure (S90) includes confirming the failed controller manual of the vehicle system controller 7 (S91), confirming the driver distance (S92), and setting the failed controller manual guidance TTS (S93). Therefore, the guiding of the failure countermeasure (S90) determines the guidance utterance distance in the N block map 40-1A of the AVNT system 6 which classifies a space of the cabin into the block positions of the coordinates of (0, 0) to (n, n), when the guidance manual for the failed controller is confirmed and selects the text to speech (TTS) of the guidance manual at the guidance utterance distance.

Particularly, the confirming of the driver distance (S92) applies "the distance<the block A", in which the "distance" refers to a value of the distance (i.e., the block N) between the vehicle system controller 7 and the driver 100 efficiently determined according to the size of the cabin of the vehicle, and the "A" uses 1. Therefore, "the distance<the block A" refers to the position at which the "distance" is away from the "block A".

Further, the setting of the failed controller manual guidance TTS (S93) selects the corresponding list of the text to speech (TTS) list in which the text contents of the failure/countermeasure manual stored in the memory 40-1 of the AVNT controller 40 is automatically converted into the speech. In particular, the TTS list may be downloaded through the Internet web using the Internet and the GPS function of the AVNT controller 40.

Therefore, the controller 20 may be configured to generate the alert combination information (S99) by confirming of the driver face direction (S60), confirming of the driver position (S70), confirming of the alert (S80), and guiding of the failure countermeasure (S90). Therefore, the alert combination information (S99) includes the vehicle front or back of the driver face direction, the driver front seat position or back seat position, the sound pressure/cycle of the failed controller alert, the TTS manual of the failed controller, and the like. Finally, the controller 20 may be configured to output the sound (S100), and output the sound (S100) targets any one or one or more of the vehicle speaker 9, the mobile device 50, and the Bluetooth earphones 60 which utter the alert combination information (S99).

Referring to FIGS. 3 and 4, the controller 20 uses the AVNT controller 40, and the alert front/back/left/right reverse determinator 43 of the AVNT controller 40 may be configured to perform the sound mixing of mobile device sound (e.g., sound A) and vehicle alert/guidance sound (e.g., sound B) through the 'AVNT↔the mobile device pairing' and the 'AVNT↔the B/T (Bluetooth) earphones pairing' to transmit the sound to the vehicle speaker 9 or the Bluetooth earphones 60, if the driver 100 automatically perceives the situation which listens to the sound of the mobile device 50.

FIG. 6 illustrates an example of the state where the driver 100 turns around the face direction from the front seat 2-1 to the back seat 2-2 freely from the driving in the state where the autonomous vehicle 1 travels at the autonomous Lv.4 or more.

As an example, the autonomous vehicle 1 may include the vehicle speaker 9 as a first vehicle speaker 9A responsible for the alert for the right headlamp problem block 8A, the engine oil problem block 8C, and the right outside mirror failure block 8F, a second vehicle speaker 9B responsible for the alert for the passenger seat seatbelt non-fastening block 8E, a third vehicle speaker 9C responsible for the alert for the front left tire problem block 8B, a fourth vehicle speaker 9D responsible for the alert for the back right door open block 8H, and a fifth vehicle speaker 9E responsible for the alert for the fuel system problem block 8D and the trunk open block 8G. However, the number of speakers may be changed according to the vehicle type and the alert segmentation.

Particularly, the first, second, third, fourth, and fifth vehicle speakers 9A, 9B, 9C, 9D, and 9E may be configured to output the failed controller mounting direction as the directionality alert such that the driver 100 may determine the failed controller mounting direction as the alert, and apply the 360° AROUND sound tuning for the directionality. The failed controller guide and the guidance case specification implemented by the controller 20 in the autonomous traveling situation are as follows.

As an example, if the right headlamp is failed, the position of the failed controller may be confirmed as the right headlamp problem block 8A of the coordinate of (0, 5), such that when the position of the driver 100 approaches within the block 1 like the coordinates of (0, 4), (1, 4), (1, 5), the first vehicle speaker 9A generates the alert together with reproducing the TTS of the manual contents. Further, the first vehicle speaker 9A is responsible for the generation of the alert together with reproducing the TTS of the manual contents with respect to the engine oil problem block 8C of the coordinate of (1, 4) and the right outside mirror failure block 8F of the coordinate of (2, 5).

Therefore, the second vehicle speaker 9B is responsible for the passenger seat seatbelt non-fastening block 8E of the coordinate of (3, 4), the third vehicle speaker 9C is responsible for the front left tire problem block 8B of the coordinate of (2, 0), the fourth vehicle speaker 9D is responsible for the back right door open block 8H of the coordinate of (5, 5), and the fifth vehicle speaker 9E is responsible for the fuel system problem block 8D of the coordinate of (6, 0) and the trunk open block 8G of the coordinate of (6, 2), such that the generating of the alert together with reproducing the TTS of the manual contents is performed in each situation.

As described above, the driver's vehicle sound perception method during the autonomous traveling of the driver sound control system 10 applied to the autonomous vehicle 1 according to the present exemplary embodiment may perceive the mobile device 50 and the Bluetooth earphones 60 held by the driver 100 within the cabin, set the driver position and face direction for the driver 100, the driver relative distance for the individual controller, and the sound pressure and cycle of the alert for the failure situation of the individual controller by the DSM controller 30 of the DSM system 5, confirm the utterance position of the alert for the driver 100 by the AVNT controller 40 of the AVNT system 6, and reproduce the failure situation of the individual controller through the vehicle speaker 9 or the Bluetooth earphones 60, thereby reproducing the vehicle alert through the left/right Bluetooth earphones 60 in the ears of the driver 100 at the level of the autonomous Lv.3 or Lv.4 freeing from the driving, such that it is possible to inform the driver of the emergency situation more effectively, thereby inducing the active countermeasure of the driver.

What is claimed is:

1. A driver's vehicle sound perception method during autonomous traveling, comprising:
   determining, by a controller, a driver state using a camera configured to monitor an inside of a vehicle, in the situation where an autonomous vehicle travels at an autonomous traveling grade;
   determining, by the controller, positions for a driver and a failed controller within a cabin of the vehicle, in the situation where any one of vehicle system controllers is failed;
   confirming, by the controller, an alert utterance position for any one of a vehicle speaker and a personal sound reproduction device of the driver within the cabin by an audio system;
   determining, by the controller, an alert output position, which assigns the alert directionality by confirming a driver face direction and a driver position by the audio system, and setting the alert according to the alert directionality;
   outputting, by the controller, the sound using any one of the vehicle speaker and the personal sound reproduction device as an alert means;
   wherein the perceiving of the driver relative distance includes:
      confirming a driver distance for a failed controller with the Bluetooth signal intensity of the personal sound reproduction device, in the situation where any one of the vehicle system controllers is failed;
      correcting the driver distance as a device-driver relative distance enhancing the accuracy with an information of a digital key or an information of a radar;

confirming a driver boarding forward or a driver boarding backward as a driver motion according to whether a seat on which the driver sits is rotated; and generating alert information by setting a sound pressure and a cycle by a combination of the device-driver relative distance and the driver boarding forward or the driver boarding backward.

2. The driver's vehicle sound perception method during the autonomous traveling of claim 1, wherein the autonomous traveling grade is the level of the autonomous Lv.3 or more.

3. The driver's vehicle sound perception method during the autonomous traveling of claim 1, wherein the personal sound reproduction device is a mobile device or Bluetooth earphones.

4. The driver's vehicle sound perception method during the autonomous traveling of claim 1, wherein the determining of the driver state includes:

activating the camera monitoring inside the vehicle, and detecting driver information by a camera image for the driver;

confirming the driver position according to whether the driver sits on a front seat or a back seat;

confirming the driver face direction according to whether the driver faces the front of the vehicle or the back of the vehicle; and generating driver posture information by combining the driver position and the driver face direction.

5. The driver's vehicle sound perception method during the autonomous traveling of claim 4, wherein the camera image is captured by the camera monitoring the inside of the vehicle configuring a driver state monitoring (DSM) system or a cabin camera installed within the cabin.

6. The driver's vehicle sound perception method during the autonomous traveling of claim 4:

wherein the camera image designates a left earphone of the driver wearing the Bluetooth earphones of the personal sound reproduction device as the left direction of the vehicle and a right earphone thereof as the right direction of the vehicle, and wherein when the left earphone is determined at the left direction of the vehicle or the right earphone is determined at the right direction of the vehicle with respect to a vehicle traveling direction, the driver face direction is confirmed as being the front of the vehicle.

7. The driver's vehicle sound perception method during the autonomous traveling of claim 1, wherein the information of the digital key is a measurement distance for the driver by applying ultra-wide band (UWB) information in an UWB triangulation method.

8. The driver's vehicle sound perception method during the autonomous traveling of claim 1, wherein the information of the radar is obtained by operating a rear occupant alert (ROA) installed on a back seat within the cabin in the autonomous traveling state.

9. The driver's vehicle sound perception method during the autonomous traveling of claim 1, wherein the driver motion is confirmed by being captured by the camera monitoring the inside of the vehicle configuring a driver state monitoring (DSM) system or a cabin camera installed within the cabin.

10. The driver's vehicle sound perception method during the autonomous traveling of claim 1, wherein the confirming of the alert utterance position includes:

activating the audio system, and confirming driver posture information with the driver position and driver face direction obtained by determining the driver state delivered by the camera monitoring the inside of the vehicle;

applying a vehicle speaker as an alert generation means, in response to determining that the driver does not wear Bluetooth earphones of the personal sound reproduction device;

applying the Bluetooth earphones or a mobile device of the personal sound reproduction device as the alert generation means, in response to determining that the driver wears the Bluetooth earphones;

determining a sound utterance position direction for the alert generation means within the cabin;

confirming a sound pressure and a cycle as alert information obtained by determining the driver relative distance; and determining the alert reproduction for each situation with the sound utterance position direction and the alert information.

11. The driver's vehicle sound perception method during the autonomous traveling of claim 1, further comprising:

applying the left/right utterance positions and front/back utterance positions of the alert determined by an N block map of the audio system which classifies a space of the cabin into the block positions of the coordinates of (0, 0) to (n, n), in response to confirming that the face direction of the driver faces the front of the vehicle; and reversing and applying the left/right utterance positions and the front/back utterance positions of the alert, in response to confirming that the face direction of the driver faces the back of the vehicle.

12. The driver's vehicle sound perception method during the autonomous traveling of claim 1, further comprising:

applying the left/right utterance positions and front/back utterance positions of the alert determined by an N block map of the audio system which classifies a space of the cabin into the block positions of the coordinates of (0, 0) to (n, n), in response to confirming that the driver sits on a front seat; and reversing and applying the left/right utterance positions and the front/back utterance positions of the alert, in response to confirming that the driver sits on a back seat.

13. The driver's vehicle sound perception method during the autonomous traveling of claim 1, wherein the setting of the alert includes:

determining the cycle and sound pressure of the alert for an alert utterance distance determined by an N block map of the audio system which classifies a space of the cabin into block positions of the coordinates of (0, 0) to (n, n), in response to confirming the failed controller.

14. The driver's vehicle sound perception method during the autonomous traveling of claim 13, wherein the alert utterance distance is determined as the degree at which the driver is close to the block position.

15. The driver's vehicle sound perception method during the autonomous traveling of claim 13, wherein the sound pressure of the alert is larger as the driver is close to the block position, and the cycle of the alert is faster as the driver is close to the block position.

16. The driver's vehicle sound perception method during the autonomous traveling of claim 1, wherein the guiding of the failure countermeasure includes:

determining a guidance utterance distance from an N block map of the audio system which classifies a space of the cabin into block positions of the coordinates of (0, 0) to (n, n), when a guidance manual for the failed controller is confirmed and selecting a text to speech (TTS) of the guidance manual at the guidance utterance distance.

17. The driver's vehicle sound perception method during the autonomous traveling of claim 1, wherein the outputting of the sound classifies the personal sound reproduction device into a mobile device and Bluetooth earphones to use them together with the vehicle speaker for outputting the alert, and performs sound mixing of the sound of the mobile device with alert sound and guidance sound to be reproduced by the vehicle speaker or the Bluetooth earphones.

18. An autonomous vehicle, comprising the controller configured to execute the method of claim 1 and further comprising:
   a driver state monitoring (DSM) system;
   an audio/video/navigation/telematics (AVNT) system;
   a vehicle system controller including a plurality of individual controllers performing the vehicle function; and
   a driver sound control system configured to determine if a driver is holding a mobile device and wearing Bluetooth earphones within a cabin, set the driver position and face direction for the driver, a driver relative distance for the individual controller, and the sound pressure and cycle of an alert for a failure situation of the individual controller by a DSM controller of the DSM system, confirm the utterance position of the alert for the driver delivered by the DSM system by an AVNT controller of the AVNT system, and reproduce the failure situation of the individual controller by a vehicle speaker or the Bluetooth earphones.

19. The autonomous vehicle of claim 18, wherein the driver sound control system is configured to correct the driver relative distance with information generated by an ultra-wide band (UWB) of a digital key and a radar of a rear occupant alert (ROA), and confirm the driver position and face direction with the image information of a DSM camera of the DSM system or a cabin camera installed within the cabin.

* * * * *